(12) United States Patent
Kanamaru et al.

(10) Patent No.: US 10,095,991 B2
(45) Date of Patent: Oct. 9, 2018

(54) RISK MEASUREMENT SYSTEM

(75) Inventors: Hiroo Kanamaru, Chiyoda-ku (JP);
Yoshitomo Asano, Chiyoda-ku (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 863 days.

(21) Appl. No.: 14/370,508

(22) PCT Filed: Jan. 13, 2012

(86) PCT No.: PCT/JP2012/050587
§ 371 (c)(1),
(2), (4) Date: Jul. 3, 2014

(87) PCT Pub. No.: WO2013/105264
PCT Pub. Date: Jul. 18, 2013

(65) Prior Publication Data
US 2015/0006240 A1 Jan. 1, 2015

(51) Int. Cl.
*G06Q 10/06* (2012.01)
*B25J 9/16* (2006.01)
(Continued)

(52) U.S. Cl.
CPC ........ *G06Q 10/0635* (2013.01); *B25J 9/1676* (2013.01); *B25J 19/06* (2013.01); *F16P 3/144* (2013.01); *F16P 3/147* (2013.01)

(58) Field of Classification Search
None
See application file for complete search history.

(56) References Cited

U.S. PATENT DOCUMENTS 4,644,237 A * 2/1987 Frushour ................ B25J 9/1676
318/582
5,047,752 A * 9/1991 Schorn ..................... F16P 3/16
192/129 A
(Continued)

FOREIGN PATENT DOCUMENTS

JP   2003-263212 A   9/2003
JP      3716803 B2   11/2005
(Continued)

OTHER PUBLICATIONS

International Search Report for PCT/JP2012/050587 dated Apr. 17, 2012.
(Continued)

*Primary Examiner* — Sujay Koneru
*Assistant Examiner* — Sarjit S Bains
(74) *Attorney, Agent, or Firm* — Sughrue Mion, PLLC; Richard C. Turner

(57) ABSTRACT

A risk measurement system according to an embodiment includes a measurement unit that obtains a distance between a mechanical device and an operator; a control device that controls the mechanical device, a display device; a risk table database that has a risk table indicating a risk value that depends on a size of damage due to a risk, a frequency of access to the mechanical device according to an operation mode, and a risk avoiding possibility; and a risk measurement device that obtains the risk value based on the avoiding possibility obtained based on the distance, the frequency of access obtained based on the operation mode of the mechanical device acquired from the control device, and the risk table, records temporal changes of the risk value, and displays the temporal changes of the risk value on the display device.

17 Claims, 3 Drawing Sheets

| MAINTENANCE MODE (S= SERIOUSLY INJURED) | | P | | |
|---|---|---|---|---|
| | | IMPOSSIBLE TO AVOID (D < 0.5 m) | POSSIBLE TO AVOID (0.5 m ≦ D < 1 m) | CERTAIN TO AVOID (D > 1 m) |
| F | FREQUENT | 90 | 60 | 30 |
| | SEVERAL TIMES/HOUR | 60 | 30 | 15 |
| | SEVERAL TIMES/DAY | 30 | 15 | 5 |

(51) Int. Cl.
*B25J 19/06* (2006.01)
*F16P 3/14* (2006.01)

(56) References Cited

U.S. PATENT DOCUMENTS

| | | | |
|---|---|---|---|
| 7,840,430 B2 | 11/2010 | Nakamura | |
| 7,888,825 B2 | 2/2011 | Iida et al. | |
| 2002/0170399 A1* | 11/2002 | Gass | B23D 59/001 83/62.1 |
| 2006/0038688 A1 | 2/2006 | Nakamura | |
| 2006/0049939 A1* | 3/2006 | Haberer | F16P 3/142 340/541 |
| 2007/0194097 A1* | 8/2007 | Jones | B25J 19/06 235/375 |
| 2008/0018472 A1* | 1/2008 | Dasilva | G08B 25/016 340/572.4 |
| 2008/0256131 A1* | 10/2008 | Shimohara | G06Q 10/06 |
| 2009/0072631 A1* | 3/2009 | Iida | B25J 19/06 307/326 |
| 2009/0083100 A1* | 3/2009 | Darby, Jr. | G06Q 10/10 705/7.28 |
| 2009/0109049 A1* | 4/2009 | Frederick | F16P 3/14 340/686.6 |
| 2009/0222134 A1* | 9/2009 | Franke | G05B 19/4061 700/251 |
| 2010/0289662 A1* | 11/2010 | Dasilva | F16P 3/147 340/686.6 |
| 2011/0133928 A1* | 6/2011 | Buck | G08B 21/0269 340/539.13 |
| 2011/0279261 A1* | 11/2011 | Gauger | F16P 3/14 340/539.1 |
| 2011/0298579 A1* | 12/2011 | Hardegger | F16P 3/14 340/3.1 |
| 2012/0098653 A1* | 4/2012 | Slack | G08G 1/163 340/435 |
| 2012/0146789 A1* | 6/2012 | De Luca | G08B 21/12 340/540 |
| 2012/0182155 A1* | 7/2012 | Sato | B25J 9/1674 340/686.6 |
| 2012/0296562 A1* | 11/2012 | Carlson | B61L 15/0027 701/301 |
| 2013/0110323 A1* | 5/2013 | Knight | G01S 13/93 701/3 |
| 2014/0025204 A1* | 1/2014 | Schlaich | B25J 9/1676 700/255 |
| 2014/0058565 A1 | 2/2014 | Shimamura et al. | |
| 2014/0088767 A1 | 3/2014 | Shimamura et al. | |

FOREIGN PATENT DOCUMENTS

| | | |
|---|---|---|
| JP | 2008-262490 A | 10/2008 |
| JP | 2009-282575 A | 12/2009 |
| JP | 4560547 B2 | 10/2010 |
| JP | 2011-70301 A | 4/2011 |
| JP | 2012-194664 A | 10/2012 |
| JP | 2012-194665 A | 10/2012 |

OTHER PUBLICATIONS

Evolution in Motion—The Machine Automation Controller (MAC) meets market needs more effectively than previous controller solutions, OMRON industry automation, 2011, pp. 1-8.

* cited by examiner

| MAINTENANCE MODE (S= SERIOUSLY INJURED) | | P | | |
|---|---|---|---|---|
| | | IMPOSSIBLE TO AVOID (D < 0.5 m) | POSSIBLE TO AVOID (0.5 m ≦ D < 1 m) | CERTAIN TO AVOID (D > 1 m) |
| F | FREQUENT | 90 | 60 | 30 |
| | SEVERAL TIMES/HOUR | 60 | 30 | 15 |
| | SEVERAL TIMES/DAY | 30 | 15 | 5 |

FIG.5

| MAINTENANCE MODE (S= SERIOUSLY INJURED) | | P | | |
|---|---|---|---|---|
| | | IMPOSSIBLE TO AVOID (T < 0.3s) | POSSIBLE TO AVOID (0.3s ≦ T <1s) | CERTAIN TO AVOID (T > 1s) |
| F | FREQUENT | 90 | 60 | 30 |
| | SEVERAL TIMES/HOUR | 60 | 30 | 15 |
| | SEVERAL TIMES/DAY | 30 | 15 | 5 |

RISK MEASUREMENT SYSTEM

CROSS REFERENCE TO RELATED APPLICATIONS

This application is a National Stage of International Application No. PCT/JP2012/050587 filed Jan. 13, 2012, the contents of which are incorporated herein by reference in their entirety.

FIELD

The present invention relates to a risk measurement system that monitors safety of a machine installed in a factory and the like.

BACKGROUND

Conventionally, there is no technique that enables to monitor safety of a machine in real time and a technique that enables to reevaluate a risk for a safety programmable controller (PLC) using a safety network based on an actual response time of the network is disclosed (see Patent Literature 1).

In the conventional technique, an object is to reevaluate a safe distance between a machine and a safety sensor or a switch based on the actual response time of the safety network on the premise that the response time changes according to usage conditions. This enables visualization of the risk and prevention measures thereof.

CITATION LIST

Patent Literature

Patent Literature 1: Japanese Patent Publication No. 3716803

SUMMARY

Technical Problem

However, in the conventional technique, although the risk of the machine is reevaluated based on the state of a safety system including the safety network, the reevaluation is performed for the machine and an operator in the proximity of the machine is not considered. Practically, the risk increases more in a case where the operator comes close to the machine or a danger zone than in usage conditions of the safety network. Therefore, not only the states of the machine and safety devices but also proximity of the operator or a position of the operator needs to be used for risk evaluation.

If a risk condition including the operator as well as the risk of the machine can be visualized and monitored, an attention state that may cause an emergency stop owing to proximity of the operator can be alerted before the safety sensor of the conventional technique operates. Furthermore, monitoring records can be used for confirmation of planning of Occupational Health and Safety Management (OHSAS 18001) such as "Reduce the attentional state by 30% to 40 hours per year next year".

The present invention has been achieved in view of the above, and an object of the present invention is to measure an operational condition of a machine and a positional relation with an operator and to monitor a current risk of the operator in real time. Another object of the present invention is to provide a risk measurement system that facilitates handling of the Occupational Health and Safety Management by continuously recording and visualizing the risk.

Solution to Problem

The present invention is directed to a risk measurement system that achieves the objects. The risk measurement system includes a measurement unit that obtains a distance between a mechanical device and an operator; a control device that controls the mechanical device; a display device; a risk table database that has a risk table indicating a risk value that depends on a size of damage due to a risk, a frequency of access to the mechanical device according to an operation mode, and a risk avoiding possibility; and a risk measurement device that obtains the risk value based on the avoiding possibility obtained based on the distance, the frequency of access obtained based on the operation mode of the mechanical device acquired from the control device, and the risk table, records temporal changes of the risk value, and displays the temporal changes of the risk value on the display device.

Advantageous Effects of Invention

The risk measurement device according to the present invention can measure and monitor in real time a safety index of a mechanical apparatus in use and thus can promptly implement a safety measure. Furthermore, data thereof can be used for confirmation or modification of a plan for Occupational Health and Safety, and the Occupational Health and Safety Management can be easily handled.

BRIEF DESCRIPTION OF DRAWINGS

FIG. 5 is an example of a risk table in a "maintenance mode" in a fifth embodiment of the present invention.

DESCRIPTION OF EMBODIMENTS

Exemplary embodiments of a risk measurement system according to the present invention will be explained below in detail with reference to the accompanying drawings. The present invention is not limited to the embodiments.

First Embodiment

Figures 1, 2:
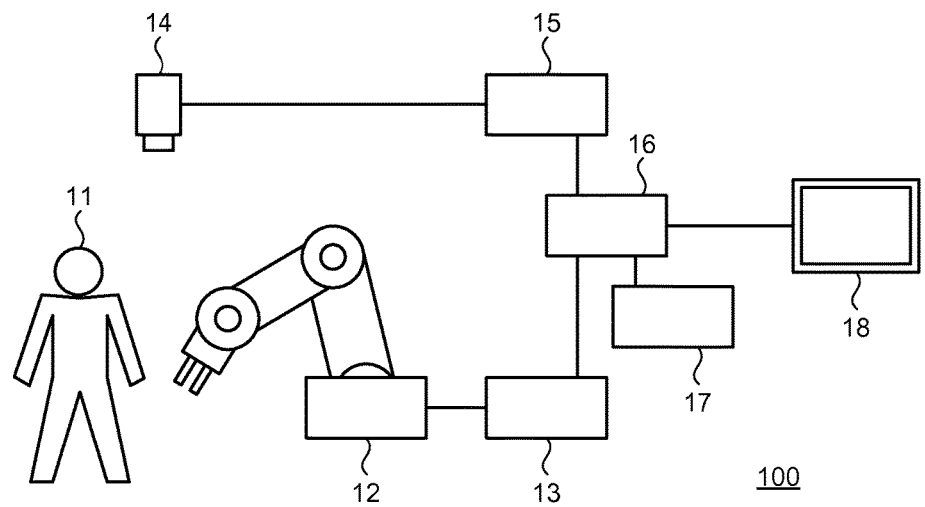
FIG. 1 depicts a configuration of a risk measurement system according to a first embodiment of the present invention.
FIG. 2 is an example of a risk table in a "maintenance mode" in the first embodiment of the present invention.

FIG. 1 depicts a configuration of a risk measurement system 100 according to a first embodiment of the present invention. In FIG. 1, the risk measurement system 100 includes an operator 11, a mechanical device 12 such as a robot, a control device 13 that controls the mechanical device 12, a sensor 14 that senses the mechanical device 12 and the operator 11, a sensor signal processor 15 connected to the sensor 14, a risk measurement device 16 connected to the control device 13 and to the sensor signal processor 15, a risk table database 17 that holds therein a risk table as risk assessment results of the mechanical device 12, and a display device 18 connected to the risk measurement device 16. The risk table database 17 is connected to the risk measurement device 16.

The sensor 14 measures a positional relation between the operator 11 and the mechanical device 12, and the signal processor 15 connected to the sensor 14 calculates a current distance D between the operator 11 and the mechanical device 12. The risk measurement device 16 acquires a current operation mode of the mechanical device 12 from the control device 13 and acquires, from the database 17, a risk table of the current operation mode related to the mechanical device 12 as a hazard source monitored by the sensor 14. In the risk table, the access frequency (F') in the operation mode and the risk avoiding possibility (P') for each of distances D between the operator 11 and the mechanical device 12 are written at the time of risk assessment. The risk table is referred to based on the current access frequency (F') and the risk avoiding possibility (P'), thereby obtaining a current risk value for a risk of collision between the operator 11 and the mechanical device 12 caused by the mechanical device 12 as the hazard source.

In the risk assessment of the mechanical device 12, a potential hazard source in the mechanical device 12 is first identified. Then, a risk value of the hazard source is obtained from a given risk table, with the size (S) of damage due to the risk that indicates a degree of greatness of damage caused by the hazard source, the access frequency (F), and the risk avoiding possibility (P) used as parameters. In this case, it is specified that the risk assessment is performed so as to cover all operation modes of the mechanical device 12, including, for example, an automatic operation mode and a maintenance mode. For example, assume that the mechanical device 12 is in the maintenance mode. In this case, S (the size of damage due to the risk) has a value not different from that at the time of risk assessment. F is not the access frequency of the mechanical device 12 in the entire life cycle, but is the frequency of access to the mechanical device 12 as a hazardous place in the operation mode. Therefore, the access frequency corresponding to the maintenance mode is selected as F, and the maximum value (frequently accessed: F="frequent") is used in the maintenance mode. P (the risk avoiding possibility) depends on the distance D between the mechanical device 12 and the operator 11, and the avoiding possibility lowers when the distance D decreases. Therefore, when the operation mode of the mechanical device 12 and the distance D between the mechanical device 12 and the operator 11 are measured, the current risk value can be obtained with reference to the results at the time of risk assessment.

The risk measurement device 16 continuously records the obtained risk value in a storage device (not shown). The display device 18 displays the current risk value of the mechanical device 12 or a time sequence thereof based on records stored in the storage device by the risk measurement device 16. This enables to monitor the current risk value of the mechanical device 12 and refer to a past history. That is, the risk of the mechanical device 12 can be monitored and recorded in real time.

A way to obtain a risk value based on the risk table in the maintenance mode shown in FIG. 2 is explained next. The risk table in FIG. 2 includes parameters of S (the size of damage due to the risk), F (the access frequency in the operation mode), and P (the risk avoiding possibility). The risk measurement device 16 acquires the current operation mode of the mechanical device 12 from the control device 13 and selects a risk table of the operation mode. FIG. 2 depicts a case where the risk table of the maintenance mode is selected. In this case, S (the size of damage due to the risk) and F (the access frequency in the operation mode) have fixed values determined at the time of risk assessment. Because the operator 11 may be "seriously injured" due to the risk of collision between the operator 11 and the mechanical device 12, S="seriously injured" in this case. However, F in this case' is the frequency of access to the mechanical device 12 as a hazardous place of the operation mode, as mentioned above.

A value ("impossible to avoid", "possible to avoid", or "certain to avoid") of P (the risk avoiding possibility) of the risk table is determined from the distance D between the operator 11 and the mechanical device 12, and the current risk value is obtained from the risk table. While the risk values in FIG. 2 are values such as 90, the risk values can be defined by using a 4-grade index, a 10-grade index, numbers such as 0 to 100, levels, or the like.

Second Embodiment

Figure 3:
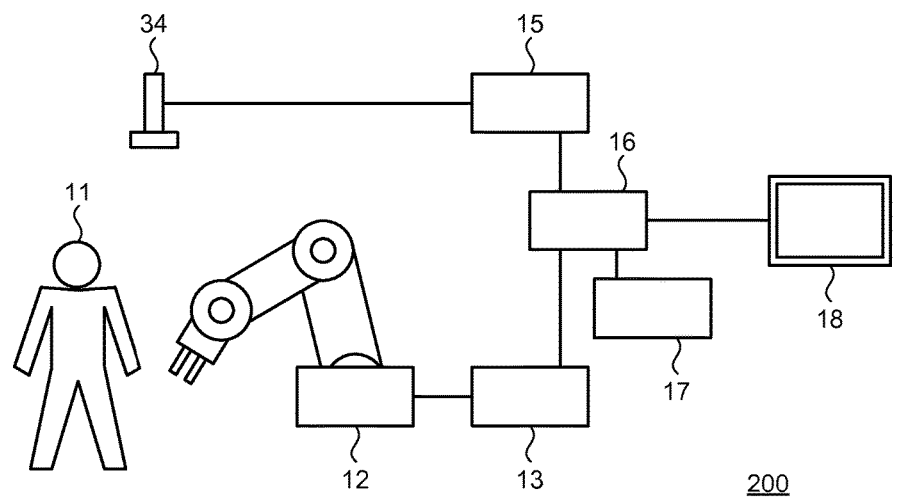
FIG. 3 depicts a configuration of a risk measurement system according to a second embodiment of the present invention.

FIG. 3 depicts a configuration of a risk measurement system 200 according to a second embodiment of the present invention. In the risk measurement system 200, a laser ranging sensor 34 is provided instead of the sensor 14 in FIG. 1. Other parts of the risk measurement system 200 have the same configuration as that in FIG. 1. In the present embodiment, to measure a positional relation between the operator 11 and the mechanical device 12, reflection of lasers or radars is used rather than an image generated by the sensor 14 used in the first embodiment, thereby measuring respective positions of the operator 11 and the mechanical device 12. As in the first embodiment, the sensor signal processor 15 obtains the distance D between the operator 11 and the mechanical device 12 based on a signal from the laser ranging sensor 34. The following procedure performed to obtain a risk value is the same as that in the first embodiment.

Third Embodiment

Figure 4:
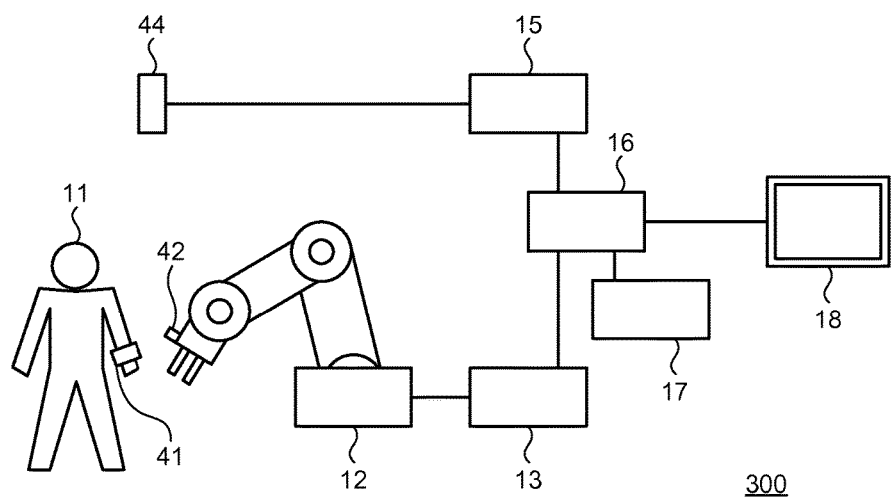
FIG. 4 depicts a configuration of a risk measurement system according to a third embodiment of the present invention.

FIG. 4 depicts a configuration of a risk measurement system 300 according to a third embodiment of the present invention. In the present embodiment, a radio frequency identification (RF-ID) is used to measure the distance D between the operator 11 and the mechanical device 12. In FIG. 4, for example, transmission devices 41 and 42 of the RF-ID or the like are attached to an end of a sleeve or a cap of the operator 11 and an end of a working part of the mechanical device 12, respectively, an antenna (antenna sensor) 44 receives radio waves thereof, and the sensor signal processor 15 connected to the antenna 44 obtains the distance D between the operator 11 and the mechanical device 12. Other parts of the risk measurement system 300 have the same configuration as that in FIGS. 1 and 3. A procedure performed to obtain a risk value after the distance D is obtained is the same as that in the first and second embodiments. Antennas can be attached to an end of the operator 11 and an end of a working part of the mechanical device 12, respectively, instead of the transmission devices 41 and 42.

Fourth Embodiment

In a fourth embodiment of the present invention, the control device 13 transmits an operation speed of the mechanical device 12 to the risk measurement device 16 in the configuration of the risk measurement system 100 as shown in FIG. 1 similar to the first embodiment. The risk measurement device 16 determines the risk avoiding possibility (P) based on the distance D between the operator 11 and the mechanical device 12 and the operation speed of the mechanical device 12. FIG. 5 is an example of a risk table in this case. FIG. 5 depicts a case where a risk table of the maintenance mode is selected, and S (the size of damage due to the risk) in this case is also set to "seriously injured".

A time T until the operator 11 and the mechanical device 12 collide with each other is calculated from the distance D and the operation speed of the mechanical device 12, and the risk avoiding possibility (P) is obtained based on T from the risk table shown in FIG. 5, thereby obtaining the current risk value.

Fifth Embodiment

In a fifth embodiment of the present invention, for example, S (the size of damage due to the risk), F (the access frequency in the operation mode), and P (the risk avoiding possibility) are quantified and the risk value is obtained by a calculation formula such as addition thereof (S+F+P) or multiplication thereof (S×F×P), without obtaining the risk value using the risk table shown in FIG. 2 or 5 as described in the first or fourth embodiment.

As described above, in the risk measurement systems according to the present embodiments, the risk measurement device 16 has the risk table based on the risk assessment results in the risk table database 17. The risk measurement device 16 receives a distance from the sensor 14 or the like that measures the distance D between the mechanical device 12 and the operator 11 and an operation mode of the mechanical device 12 from the control device 13 as inputs, selects a risk table corresponding the operation mode, and obtains the current risk value based on the current access frequency F and the avoiding possibility P obtained from the distance D between the mechanical device 12 and the operator 11. The obtained risk value is displayed on the display device 18 or recorded in a storage device. Accordingly, the operator 11 and the mechanical device 12 are monitored in real time and the current risk is continuously measured based the risk assessment results at the time of design. That is, the risk of the mechanical device 12 can be measured in real time.

Furthermore, the invention of the present application is not limited to the above embodiments, and when the present invention is carried out, the invention can be variously modified without departing from the scope thereof. In the above embodiments, inventions of various stages are included, and various inventions can be extracted by appropriately combining a plurality of constituent elements disclosed herein. For example, even when some constituent elements are omitted from all constituent elements described in the embodiments, as far as the problems mentioned in the section of Solution to Problem can be solved and effects mentioned in the section of Advantageous Effects of Invention are obtained, the configuration from which these constituent elements have been omitted can be extracted as an invention. In addition, constituent elements mentioned in different embodiments can be appropriately combined.

INDUSTRIAL APPLICABILITY

As described above, the risk measurement system according to the present invention is useful for real-time monitoring of a current risk of an operator, and is particularly suitable for facilitation of handling of the Occupational Health and Safety Management because the risk of the operator is continuously recorded and visualized.

REFERENCE SIGNS LIST 11 operator
12 mechanical device
13 control device
14 sensor
15 sensor signal processor
16 risk measurement device
17 risk table database
18 display device
34 laser ranging sensor
41, 42 transmission device
44 antenna
100, 200, 300 risk measurement system

The invention claimed is:

1. A risk measurement system comprising:
a measurement unit that obtains a distance between a mechanical device and an operator;
a control device that controls the mechanical device;
a display device;
a memory comprising a risk table database that stores a plurality of risk tables for a plurality of operation modes of the mechanical device, each of the plurality of risk tables comprising a first parameter indicating a magnitude of damage due to a risk and a second parameter indicating a risk avoiding possibility of a plurality of distance ranges between the operator and the mechanical device, wherein each of the plurality of distance ranges comprises at least two frequencies of access to the mechanical device and a respective risk value from among a plurality of risk values for each of the at least two frequencies of access; and
a risk measurement device that obtains a current operation mode of the mechanical device, selects a risk table from among the plurality of risk tables based on the current operation mode of the mechanical device, obtains the risk value based on the avoiding possibility obtained based on the distance obtained by the measurement unit, the frequency of access obtained based on the current operation mode of the mechanical device acquired from the control device, and the selected risk table, records temporal changes of the risk value, displays the temporal changes of the risk value on the display device, and is connected to the control device, which executes an emergency stop of the mechanical device based on at least one of the obtained risk value and the temporal changes of the risk value.

2. The risk measurement system according to claim 1, wherein the risk measurement device obtains the avoiding possibility based on an operation speed of the mechanical device acquired from the control device.

3. The risk measurement system according to claim 2, wherein the risk measurement device obtains the avoiding possibility based on a collision time between the operator and the mechanical device, the collision time being calculated based on the distance and the operation speed.

4. The risk measurement system according to claim 1, wherein the measurement unit includes a sensor and a signal processor connected to the sensor and to the risk measurement device.

5. The risk measurement system according to claim 1, wherein the measurement unit includes transmission devices or antennas attached to the operator and the mechanical device, respectively, and an antenna sensor, and obtains the distance by an RF-ID.

6. The risk measurement system according to claim 1, wherein the control device stops the mechanical device based on the alarm value received from the risk measurement device.

7. The risk measurement system according to claim 1, wherein the risk measurement device continuously records obtained risk values in the memory and the display device displays a time sequence of the recorded obtained risk values as past history.

8. The risk measurement system according to claim 1, wherein the risk measurement device obtains current risk value in real time and the display device displays the current risk value.

9. The risk measurement system according to claim 1, wherein the plurality of distance ranges comprise a first distance range in which a collision between the operator and the mechanical device is impossible to avoid, a second distance range in which the collision between the operator and the mechanical device is possible to avoid, and a third distance range in which the collision between the operator and the mechanical device is certain to be avoided.

10. The risk measurement system according to claim 9, wherein the at least two frequencies of access to the mechanical device comprise a first frequency of access indicating frequent access to the mechanical device, a second frequency of access indicating the access to the mechanical device as several times an hour, and a third frequency of access indicating the access to the mechanical device as several times in a day.

11. The risk measurement system according to claim 10, wherein the risk measurement device obtaining the avoiding possibility is further based on a collision time between the operator and the mechanical device, the collision time being calculated based on the distance and the operation speed and comprising a first collision time interval in which a collision between the operator and the mechanical device is impossible to avoid, a second collision time interval in which the collision between the operator and the mechanical device is possible to avoid, and a third collision time interval in which the collision between the operator and the mechanical device is certain to be avoided.

12. The risk measurement system according to claim 1, wherein the risk measurement device obtaining the avoiding possibility is further based on a collision time between the operator and the mechanical device, the collision time being calculated based on the distance and the operation speed and comprising a first collision time interval in which a collision between the operator and the mechanical device is impossible to avoid, a second collision time interval in which the collision between the operator and the mechanical device is possible to avoid, and a third collision time interval in which the collision between the operator and the mechanical device is certain to be avoided.

13. The risk measurement system according to claim 12, wherein the at least two frequencies of access to the mechanical device comprise a first frequency of access indicating frequent access to the mechanical device, a second frequency of access indicating the access to the mechanical device as several times an hour, and a third frequency of access indicating the access to the mechanical device as several times in a day.

14. A risk measurement device characterized in that:
the risk measurement device is connected to a memory comprising a risk table database that stores a plurality of risk tables for a plurality of operation modes of a mechanical device, each of the plurality of risk tables comprising a first parameter indicating a magnitude of damage due to a risk and a second parameter indicating a risk avoiding possibility of a plurality of distance ranges between the operator and the mechanical device, wherein each of the plurality of distance ranges comprises at least two frequencies of access to the mechanical device and a respective risk value from among a plurality of risk values for each of the at least two frequencies; and
the risk measurement device obtains a current operation mode of the mechanical device, selects a risk table from among the plurality of risk tables based on the current operation mode of the mechanical device, obtains the risk value based on the avoiding possibility obtained based on the distance between the mechanical device and the operator, the frequency of access obtained based on the current operation mode of the mechanical device, the current operation mode being acquired from a control device that controls the mechanical device, and the selected risk table, records temporal changes of the risk value, displays the temporal changes of the risk value on a display device, and outputs a command to stop the mechanical device based on the at least one of the obtained risk value and the temporal changes of the risk value.

15. The risk measurement device according to claim 14, wherein the avoiding possibility is obtained based on an operation speed of the mechanical device acquired from the control device.

16. The risk measurement device according to claim 15, wherein the avoiding possibility is obtained based on a collision time between the operator and the mechanical device, the collision time being calculated based on the distance and the operation speed.

17. The risk measurement device according to claim 14, wherein: the risk measurement device is connected to a signal processor connected to a sensor; and a measurement unit that includes the sensor and the signal processor measures the distance between the mechanical device and the operator.

* * * * *